(12) United States Patent
Lozinski

(10) Patent No.: US 7,232,255 B2
(45) Date of Patent: Jun. 19, 2007

(54) SYSTEM FOR MEASURING HEAT FLOW

(75) Inventor: Yuli Lozinski, Jerusalem (IL)

(73) Assignee: Alina Lozinski, Jerusalem (IL)

( * ) Notice: Subject to any disclaimer, the term of this patent is extended or adjusted under 35 U.S.C. 154(b) by 124 days.

(21) Appl. No.: 11/132,897

(22) Filed: May 19, 2005

(65) Prior Publication Data
US 2005/0259714 A1    Nov. 24, 2005

(30) Foreign Application Priority Data
May 20, 2004    (IL) ..................... 162091

(51) Int. Cl.
*G01K 17/00*    (2006.01)
*G01N 25/20*    (2006.01)

(52) U.S. Cl. .............. 374/29; 374/43; 374/44

(58) Field of Classification Search ............ 374/1, 374/43–44, 29
See application file for complete search history.

(56) References Cited

U.S. PATENT DOCUMENTS

| | | | |
|---|---|---|---|
| 4,274,475 A | 6/1981 | Rall et al. | 165/211 |
| 4,553,852 A * | 11/1985 | Derderian et al. | 374/1 |
| 4,944,035 A * | 7/1990 | Aagardl et al. | 702/136 |
| 5,524,618 A | 6/1996 | Pottgen et al. | 600/306 |
| 5,803,915 A | 9/1998 | Kremenchugsky et al. | 600/549 |
| 5,842,788 A * | 12/1998 | Danley et al. | 374/12 |
| 6,241,383 B1 * | 6/2001 | Feller et al. | 374/40 |
| 6,367,970 B1 * | 4/2002 | Danielson | 374/43 |
| 6,370,939 B2 * | 4/2002 | Smith et al. | 374/43 |
| 6,533,731 B2 | 3/2003 | Pottgen et al. | 600/549 |
| 6,595,929 B2 | 7/2003 | Stivoric et al. | 600/549 |
| 2006/0256835 A1 * | 11/2006 | Romes | 374/29 |

* cited by examiner

*Primary Examiner*—Yaritza Guadalupe-McCall
(74) *Attorney, Agent, or Firm*—Schneck & Schneck; Thomas Schneck

(57) ABSTRACT

The invention provides a system for determining the heat flow rate between a first and a second medium, the system including at least two sensor units having signal outputs disposed in a spaced-apart relationship, each of the units including a transducer having apertures allowing fluid to pass therethrough; the transducer of a first sensor unit is affixable to a first surface on the first medium, the heat flow of which is to be determined and a second surface of the first transducer is exposed to the second medium; a first surface of the transducer of a second sensor unit is affixable to a calibration plate, the calibration plate is affixable to the first medium, the heat flow of which is to be determined and the second surface of the transducer is exposed to the second medium; the signal outputs of the transducers are connectable to a processing unit for determining changes in the heat flow between the first and the second sensor units.

10 Claims, 2 Drawing Sheets

SYSTEM FOR MEASURING HEAT FLOW

FIELD OF THE INVENTION

The present invention relates to a system for the measurement of heat flowing between an object and the ambient air, that may be used in medicine, agriculture, building, and other fields.

BACKGROUND OF THE INVENTION

Heat flow measurements are widely used in medicine, for diagnosing building walls, the agricultural soils and the like, as described in U.S. Pat. Nos. 4,274,475; 5,524,618; 5,803,915; 6,533,731 and 6,595,929. Such measurements are characterized by placing heat flow sensors on opposite surfaces of a wall or barrier. The steady heat flow through the barrier can thus be measured. Heat flux and temperature differences can be digitally determined and recorded.

The shortcoming of these measurements is the fact that it is not always possible to place heat flow sensors on both sides of a wall or barrier. For example, without performing a surgical procedure, it is not possible to place heat flow sensors inside a living body. Similarly, without digging, it is not possible to place a sensor into the ground.

SUMMARY OF THE INVENTION

It is therefore a broad object of the present invention to overcome the disadvantages of the prior art systems for measuring heat flow rates between two sides of a wall or barrier.

It is a further object of the present invention to provide a system for measuring the heat flow between two media on opposite sides of a wall or barrier, where access to only one side is available.

In accordance with the present invention, there is provided a system for determining the heat flow rate between a first and a second medium, said system comprising at least two sensor units having signal outputs disposed in a spaced-apart relationship, each of said units including a transducer having apertures allowing fluid to pass therethrough; the transducer of a first sensor unit being affixable, at least indirectly, to a first surface on said first medium, the heat flow of which is to be determined, a second surface of said first transducer being exposed to said second medium; a first surface of the transducer of a second sensor unit being affixable to a calibration plate, said calibration plate being affixable to said first medium, the heat flow of which is to be determined; the second surface of said transducer being exposed to said second medium; the signal outputs of said transducers being connectable to a processing unit for determining and measuring changes in the heat flow between said first and said second sensor units.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 illustrates a system for measuring heat flow according to the present invention;

FIGS. 2, 2A, 3 and 3A are schematic front and side views of embodiments of transducers utilizable with the present invention;

FIG. 4 is a schematic illustration of an embodiment of the invention for monitoring the distention level of a patient's urine bladder, and FIG. 5 is a block diagram illustrating a method according to the present invention for utilizing the system of FIG. 4.

DETAILED DESCRIPTION

Figure 1:
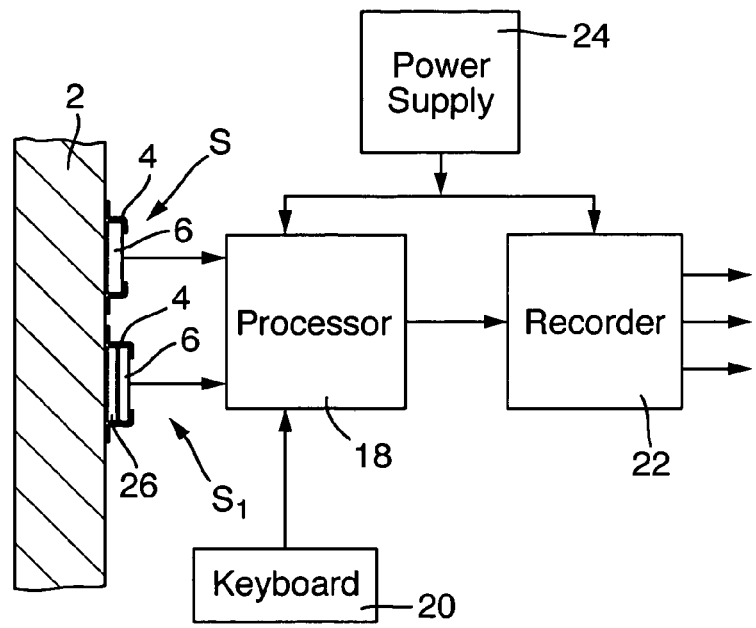

FIG. 1 illustrates an embodiment of a system for determining or measuring heat flow rate according to the present invention. Shown is a wall or barrier 2, the heat flow rate between two sides of which is to be determined or measured. Such a wall or barrier 2 may be the abdominal wall of a living body, the wall of a building, an area of land or the like, wherein only one side of the barrier is exposed to the environment and the other is inaccessible. The system includes two or more sensor units S, $S_1$, each unit having means 4, such as adhesive tapes, straps, belts, brackets or the like, for permanently or temporarily attaching or coupling it to the barrier.

Figure 2:
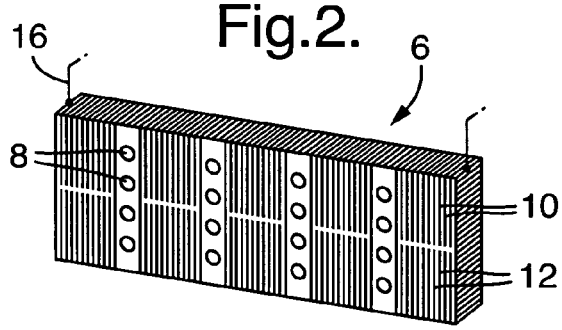
Figure 2A:
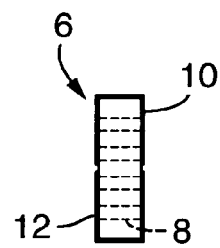
Figure 3:
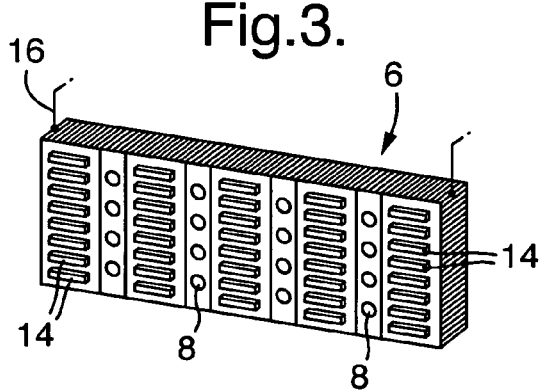
Figure 3A:
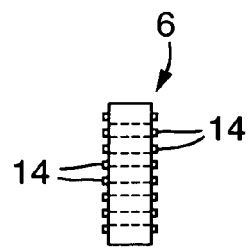

The first unit S is composed of a per-se known sensor 6, constituted by a transducer for converting heat into electrical signals. Sensor 6 is advantageously made with through-going apertures 8, as illustrated in FIGS. 2, 2A, 3 and 3A, so as to allow the passage of fluid, e.g., air, gas or moisture, from one side of the sensor to the other. Each sensor 6 may be composed of banks of interlaced copper wires 10 and constantan wires 12, as shown in FIG. 2, or of stacks and/or banks of temperature-sensitive elements 14, such as thermistors, as shown in FIG. 3. Electrical output wires 16 are also provided. The sensor 6 may advantageously be made of flexible material, such as a polymer, so as to better fit the contours of the wall or barrier to which it is applied. Furthermore, the surfaces of the sensor may be coated with moisture-proof material or, for medical purposes, with hypoallergenic material.

Further illustrated in FIG. 1 is a processing unit 18, operable by means of a keyboard 20, an optional recording device 22 and a power supply 24. The output from device 22 may lead to a display screen, a sound-producing device, a tactile device, or a combination of these.

The present invention is based on the use of at least two heat flow sensor units having openings for the passage of fluid, attaching one side of the units to one side of the measured object. The first sensor unit S is directly attached to the surface of the measured object, whereas the second sensor unit $S_1$ is attached to a calibration plate 26 having predetermined heat and physical characteristics. The second sides of sensor units S, $S_1$ are adapted to be in contact with the ambient air. Calibration plate 26 is made of any material having a know coefficient of theremoconductance λ. Advantageously, the surface area of the calibration plate should substantially correspond to the surface area of the sensor.

The heat flow q through barrier 2 is approximately determined by the formula:

$$q = \lambda/\delta(t_1 - t_2) \text{ or } (t_1 - t_2) = \frac{q \cdot \delta}{\lambda}, \quad (1)$$

wherein:
$\lambda$=the coefficient of thermal conductivity of the medium to be measured;
$\delta$=the thickness of the medium, and
$t_1$ and $t_2$=the input and output temperatures of the medium to be measured.

When calibration plate 26 is added, the temperatures $t_1$ and $t_2$ do not change, and the the heat flow rate $q_a$, is determined by the formula:

$$(t_1 - t_2) = q_a(\delta/\lambda + \delta_a/\lambda_a) \text{ or } q_a = \frac{(t_1 - t_2)}{(\delta/\lambda + \delta_a/\lambda_a)}, \quad (2)$$

wherein:
$\lambda_a$=the coefficient of thermal conductivity of the calibration plate;
$\delta_a$=the thickness of the calibration plate;
$t_1$ and $t_2$=the input and output temperatures of the medium to be measured, and
$\lambda_a/\delta_a$=the heat conduction of the calibration plate.

$$\lambda = \frac{q - q_a}{q_a} \cdot \frac{\delta}{\delta_a} \lambda_a \quad (3)$$

Thus:

The values of q and $q_a$ are determined by heat flow sensor units S, $S_1$; the values $\lambda_a$ and $\delta_a$ are constant and are determined by the calibration plate. The value $\delta$ is determined by the medium to be measured, and can be approximated. Thus, the value $\lambda$ does not depend from the temperatures $t_1$ and $t_2$ and other meteorological factors.

Hence, monitoring of the value $\lambda$ permits the determination of changes in the coefficient of thermal conductivity of the area of the barrier of the medium where the measurement is performed. For example, the change of moisture within soil, changes in the quantity of milk within a woman's breast, or changes in the distention level of a patient's urine bladder, may be determined according to the invention.

Figure 4:
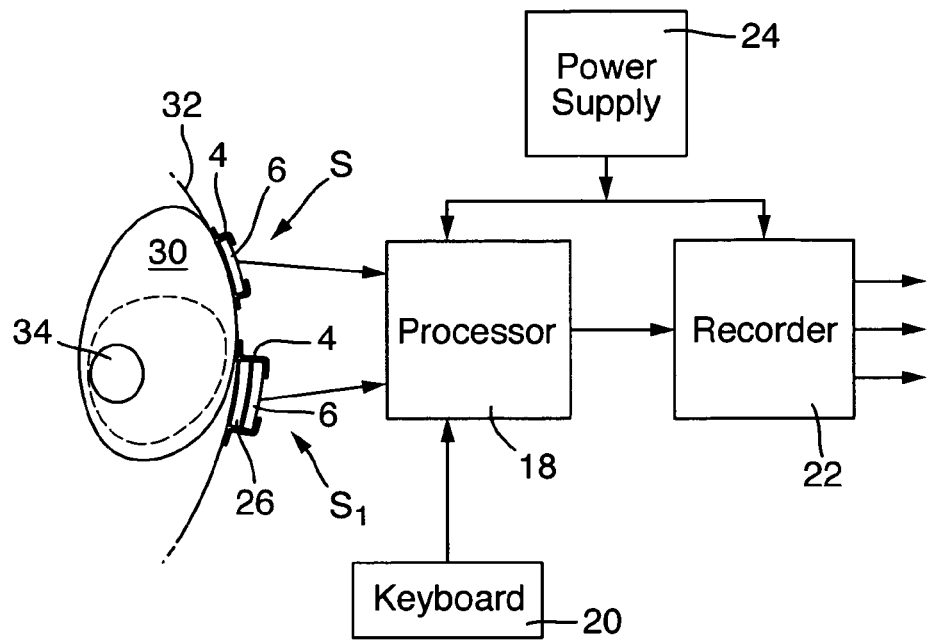

Referring now to FIG. 4, there is illustrated an embodiment of the invention for monitoring the distention level of a patient's urine bladder. Shown is abdominal cavity 30, defined by front wall 32. The outline of a substantially empty urine bladder 34 is depicted within the abdominal cavity in solid lines. The broken lines depict the bladder when it is partially full of urine. Sensor units S, $S_1$ are affixed to the outside of abdominal wall 32. Sensor unit $S_1$ is provided with a calibration plate 26, which touches wall 32.

As is known, the temperature on the inside of the living body of a patient is approximately 36° C., and on the outside thereof, it is approximately 28° C. Therefore, the body constantly radiates heat. If liquid such as urine, or milk, accumulates in the way of the heat flow, then the volume of the heat flow at that location is lower, since liquid possesses a considerable heat capacity. As mentioned above, the two sensor units S, $S_1$ are attached on one of their sides to the object being measured. The first sensor unit S is directly attached to the surface of the patient's abdominal wall 32, whereas the second sensor unit $S_1$ is attached to a calibration plate 26, the latter being in contact with wall 32. The second sides of sensor units S, $S_1$ are adapted to be in contact with the ambient air. The sensors will thus react to the entrance of urine into the patient's bladder.

Figure 5:
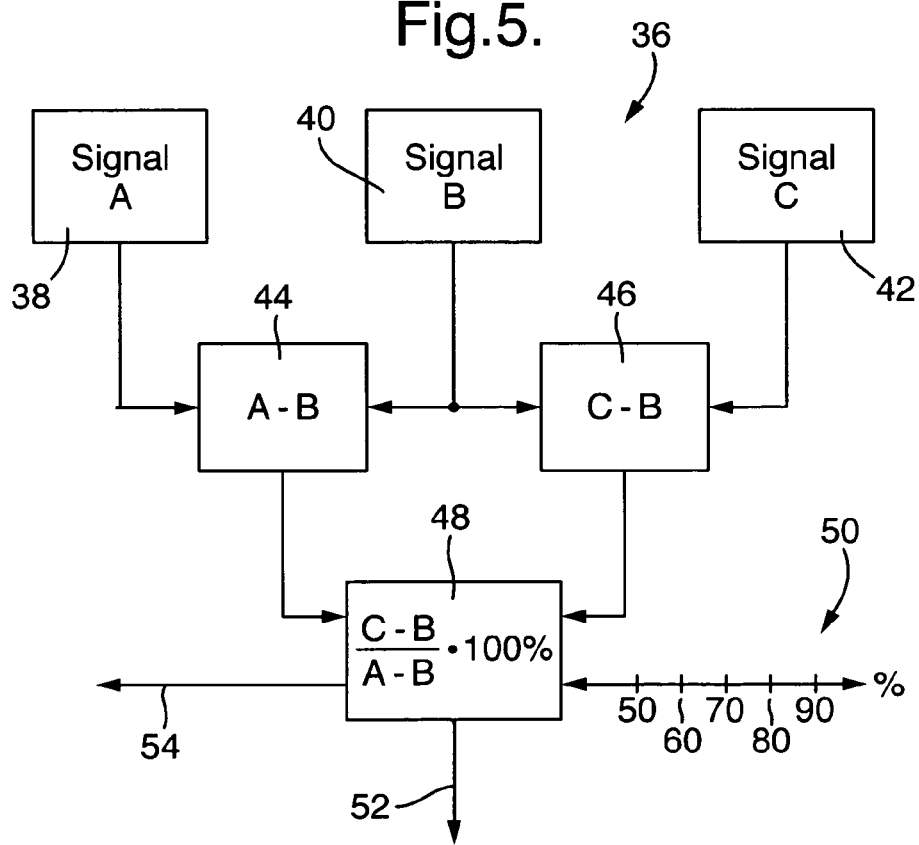

FIG. 5 illustrates the operation of measuring unit 36 and explains how changes in the output signals will determine the state of the patient's bladder, from being substantially empty to mostly full. In step (38), signal A is obtained, wherein the bladder is recorded as being substantially empty. Similarly, in step (40), signal B is obtained when the bladder is substantially full. At step (42), a reference signal C is recorded. Measuring unit 36 then calculates, at 44 and 46, the two values A–B and C–B. Subsequently, at 48, the ratio $$\frac{C - B}{A - B} \cdot 100\%$$

is calculated, to obtain a value for producing an output signal as determined by the user's setting in step 50, e.g., the setting that actuates an output signal at 50%, 60%, 70%, 80% or 90% of bladder capacity. The output signal at 52 is fed to the optional recording device 22, or directly at 54 to a display or alarm-actuating device.

The sensor units S, $S_1$ may be configured to intimately contact a known contour of a surface of the wall or barrier, the heat flow rate of which is to be monitored. A plurality of sensor units may be affixed on a single base, e.g., a fabric or another flexible surface, facilitating their easy attachment to walls or barriers and allowing intimate contact between them.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for determining and measuring the heat flow rate between a first and a second medium, said system comprising:

at least two sensor units having signal outputs disposed in a spaced-apart relationship, each of said units including a transducer having apertures allowing fluid to pass therethrough;

the transducer of a first sensor unit being affixed, at least indirectly, to a first surface on said first medium, the heat flow of which is to be determined, a second surface of said first transducer of the first sensor unit being exposed to said second medium;

a first surface of the transducer of the second sensor unit being affixed to a calibration plate or a known coefficient of thermal conductivity, said calibration plate being located between said second sensor unit and said first medium and exposed to said first medium, the heat flow rate of which is to be determined, the second surface of said transducer of the second sensor unit being exposed to said second medium;

the signal outputs of said transducers being connectable to a processing unit for determining and measuring changes in the heat flow between said first and said second mediums.

2. The system as claimed in claim 1, wherein said first medium is a living body, a structural element, or soil.

3. The system as claimed in claim 1, wherein said second medium is ambient air.

4. The system as claimed in claim 1, wherein said sensor units are mounted in spaced-apart relationship.

5. The system as claimed in claim 1, wherein said transducers comprise banks and/or stacks at copper wires and constantan wires, or temperature-sensitive elements.

6. The system as claimed in claim 1, wherein said processing unit is connected to a device selected from the group at recording, display or alarm devices.

7. The system as claimed in claim 1, wherein the heat flow rate of each of said sensor units enables the calibration of the coefficient of thermal conductivity $\lambda$ of said first medium, by using the formula $$\lambda = \frac{q - q_a}{q_a} \cdot \frac{\delta}{\delta_a} \lambda_a$$

wherein:

$q$ and $q_a$ are the heat flow rates determined by said first and second sensors, respectively;

$\delta$ is the thickness of the first medium, and $\lambda_a$ and $\delta_a$ are constants, corresponding to the coefficient of thermal conductivity and the thickness of the calibration plate.

8. The system as claimed in claim 1, wherein said first medium is a wall or a barrier having two opposite sides.

9. The system as claimed in claim 8, wherein said first and said second sensor units are both affixed to the same side of said first medium.

10. The system as claimed in claim 1, wherein at least one of said sensor units is made of a flexible material.

* * * * *